United States Patent [19]
Pierse

[11] Patent Number: 5,996,431
[45] Date of Patent: Dec. 7, 1999

[54] TWIST ACTION FRICTION DRIVE

[75] Inventor: Michael George Pierse, Bedford, United Kingdom

[73] Assignee: Unova U.K. Limited, Avlesbury, United Kingdom

[21] Appl. No.: 09/051,248

[22] PCT Filed: Apr. 30, 1997

[86] PCT No.: PCT/GB97/01174
§ 371 Date: Apr. 2, 1998
§ 102(e) Date: Apr. 2, 1998

[87] PCT Pub. No.: WO98/10206
PCT Pub. Date: May 12, 1998

[30] Foreign Application Priority Data

Sep. 6, 1996 [GB] United Kingdom ............... 9618642

[51] Int. Cl.$^6$ .................................................. F16H 21/16
[52] U.S. Cl. ........................................ 74/25; 74/89
[58] Field of Search .................. 74/25, 89, 60; 384/100

[56] References Cited

U.S. PATENT DOCUMENTS

| | | | |
|---|---|---|---|
| 4,203,328 | 5/1980 | De Boynton | 74/25 |
| 4,760,864 | 8/1988 | Leclerc | 74/25 |
| 4,921,207 | 5/1990 | Baker | 74/25 |
| 5,363,711 | 11/1994 | Seto | 74/25 |

FOREIGN PATENT DOCUMENTS 30 05 147  2/1981  Germany .
61038256  2/1986  Japan .

OTHER PUBLICATIONS

Marks' Standard Handbook For Mechanical Engineers, 10th Ed, pp. 8–130 to 8–131.

Primary Examiner—Tamara L. Graysay
Assistant Examiner—David Fenstermacher
Attorney, Agent, or Firm—Lee, Mann, Smith, McWilliams, Sweeney & Ohlson

[57] ABSTRACT

A twist action roller friction drive comprises a rotating drive bar which drives in rotation a roller the axis of rotation of which is inclined relative to the axis of a rotationally fixed driven member with which the roller engages. The inclined roller comprises a single annular roller urged from the inside into driving contact with the driven member by one or more hydrostatic pads. The driven member is a tube and the skewed annular roller is in frictional engagement with the bore of the tube. In a typical use, the tube is fixed to the carriage of a machine tool and is aligned with the machine axis. Oil for the hydrostatic pad(s) acting on the roller is supplied through the drive bar along the axis thereof At its trailing end, the drive bar rotationally drives a skewed roller assembly in which the annular roller is incorporated, the remote forward end of the drive bar being driven in rotation, as by an electric motor Axial movement of the driven member is principally determined by the angle of skew of the roller so that if this angle is made very small, similarly small precise axial movements of the driven member of as little as 1 nm (nanometre) or less can be readily achieved, per revolution of the drive bar. This permits a high speed drive motor and in turn velocity feed back control.

17 Claims, 4 Drawing Sheets

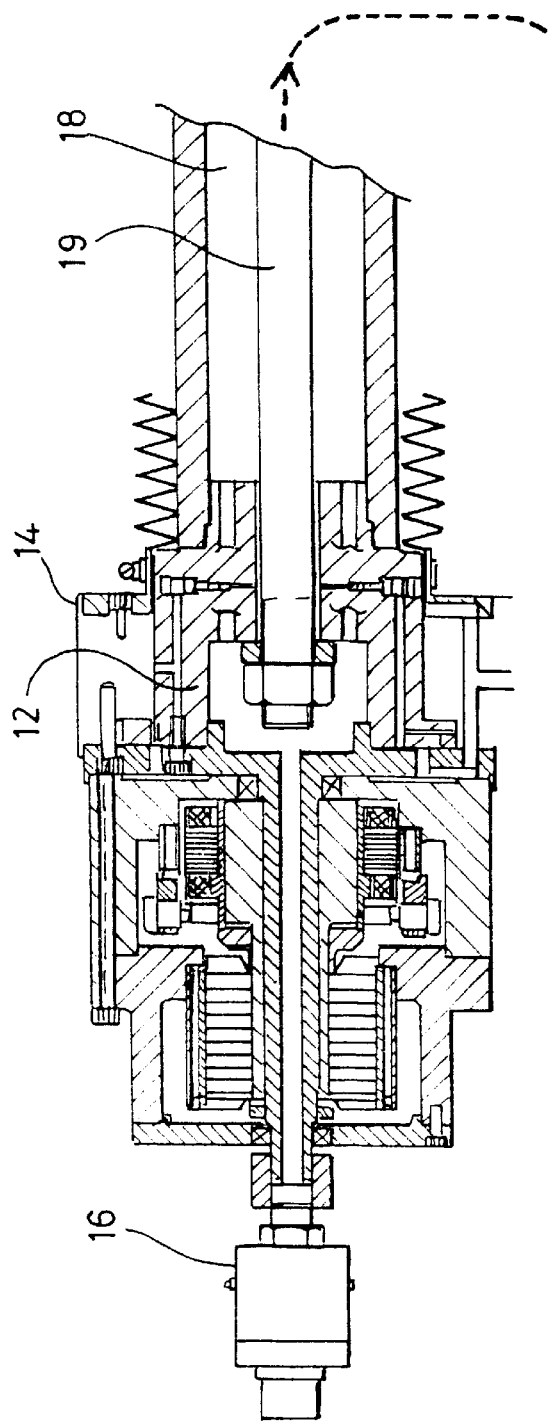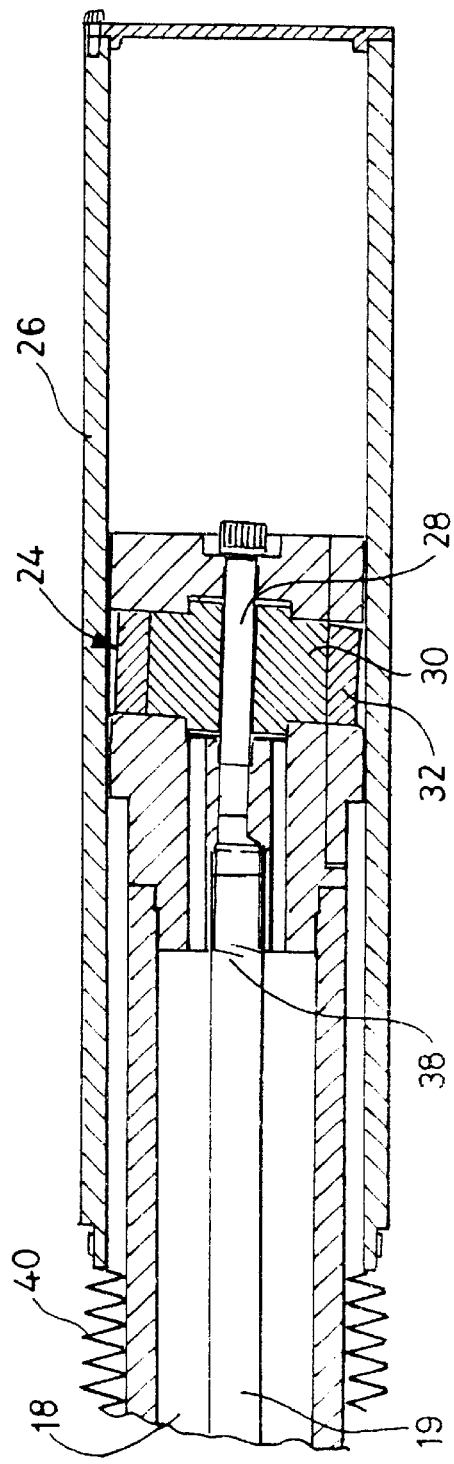
Fig. 1

TWIST ACTION FRICTION DRIVE

FIELD OF THE INVENTION

This invention relates to twist action friction drives.

PRIOR ART

From the prior art is known a twist action friction drive in which a roller means, driven in rotation about-: an axis inclined to that of a driven member, comprises three rollers all hydrostatically mounted about axes inclined relative to that of the driven member. The arrangement is complex, and requires that all the rollers are mounted at precisely the same inclination or helix angle if conflicting drive forces, leading to an unpredictable advance of the driven member, are to be avoided. This and other prior art arrangements are also disadvantageous in that the rollers rotate around the outside of the driven member.

THE INVENTION

According to the invention, there is provided a twist roller friction drive comprising a rotating drive bar which drives in rotation roller means the axis of rotation of which is inclined relative to the axis of a rotationally fixed driven member with which the roller means engages, wherein the inclined roller means comprises a single annular roller urged from the inside into driving contact with the driven member by one or more hydrostatic pads.

Preferably the driven member is a tube and the skewed annular roller is in frictional engagement with the bore of the tube. The tube is preferably a steel tube, with a hardened and ground bore. In a typical use, the tube is fixed to the carriage of a machine tool, aligned with the machine axis.

oil for the hydrostatic pads acting on the roller is preferably supplied through the drive bar along the axis thereof. Such drive bar preferably comprises a cylindrical tube.

At its trailing end, the drive bar rotationally drives a skewed roller assembly in which the annular roller is incorporated, the remote forward end of the drive bar being driven in rotation, as by an electric motor. The rotatlionally driven, forward end of the drive bar is preferably located, albeit indirectly, by hydrostatic bearings. The oil supply for these bearings therefore constitutes a convenient source from which oil may be supplied along the central axis of the drive bar to the skewed roller assembly, via suitable resticttors.

At the skewed roller assembly, drillings are preferably provided to supply oil to the bore and end faces of the roller, so that it is fully floating hydrostatically. Further drillings may supply oil to four equianbyularly spaced hydrostatic pads which urge the skewed roller assembly radially so that the roller is in frictional driving engagement with the driven tube. Oil seeping from the roller assembly is preferably returned to a sump at the driven end of the drive bar, conveniently via the interior of an extensible tube (which may be corrugated for this purpose or of a telescoping design), which is secured between the forward end of the driven tube and a housing at the forward end of the drive bar wherein drillings are provided to supply oil to the hydrostatic bearings which locate a rotating assembly carrying the forward end of the drive bar.

In the arrangement according to the invention, the axial movement of the driven member is principally determined by the angle of skew of the roller. Thus, if this angle is made very small, small precise axial movements of say 1 nm (nanometre) or less of the driven member can readily be achieved per revolution of the drive bar, as compared, for example, to axial movements of the order of 150 mm per revolution with a capstan drive, and 10 to 15 mm in the case of a hydrostatic nut drive. It follows that a relatively high speed drive motor can be employed, which is advantageous for velocity feedback control.

DESCRIPTION OF EMBODIMENT

A practical example of twist action friction drive is now described by way of example with reference to the accompanying drawings, in which:

FIG. 1 shows the complete drive in axial cross section;

Figure 2:
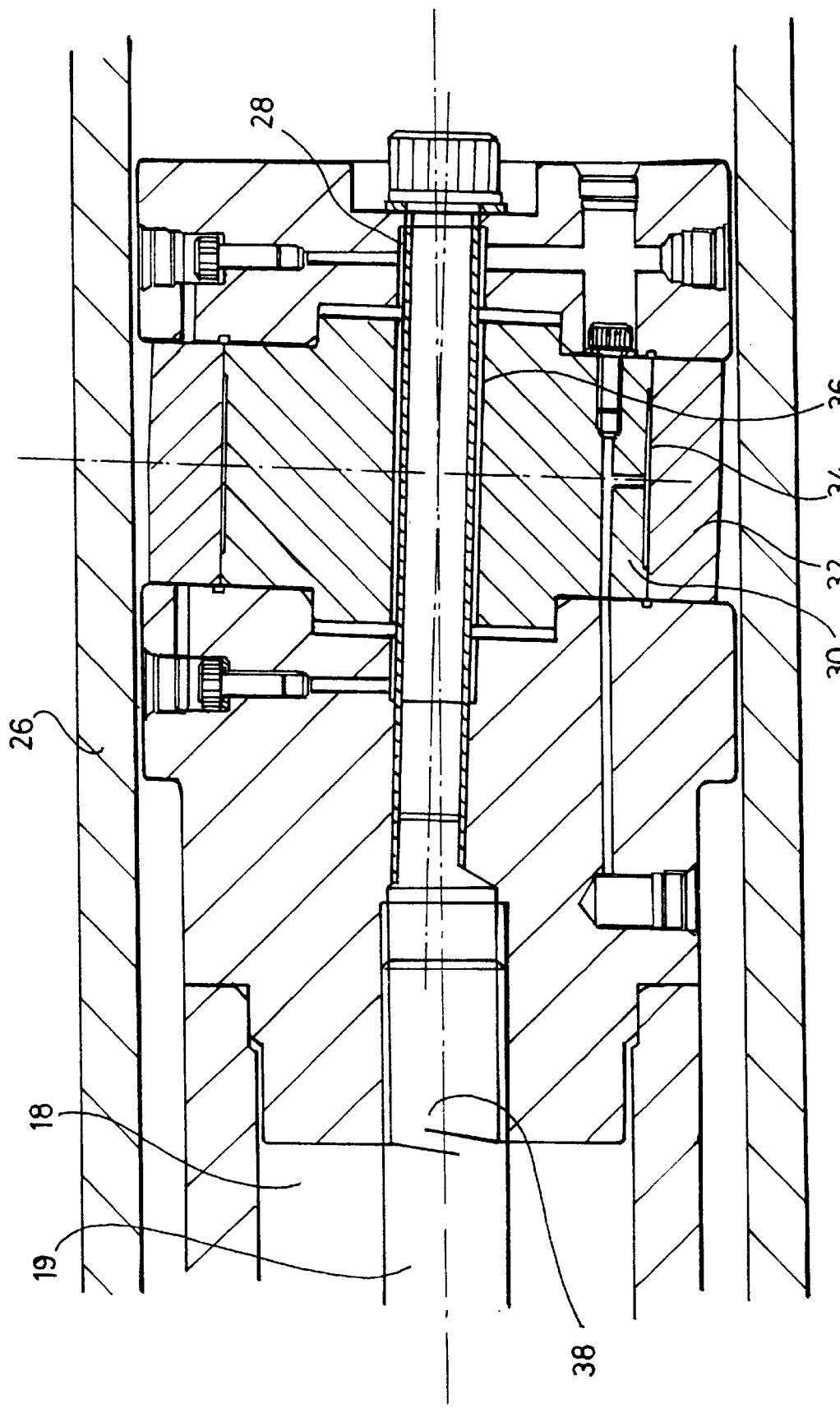
FIGS. 2 and 3 are axial cross sections, in different planes, through the skewed roller assembly.

The twist action friction drive shown in FIG. 1 comprises, on the left, a driving head 10 wherein an assembly 12 within a housing 14 is able to be driven in rotation by an electric motor 16 in order to impart a rotational drive to the forward end of a drive bar 18 in the form of a cylinder having a central axial passage 19. The construction of the driving head 10 is not of importance in the present invention except for the hydrostatic bearings 20 used in the rotating assembly 12. An oil return passage to the sump is indicated at 22. The motor 16 includes a tachometer 17 for measuring the speed of the motor output and a control unit 15 for controlling the motor speed in response to the output from the tachometer 17.

Figure 3:
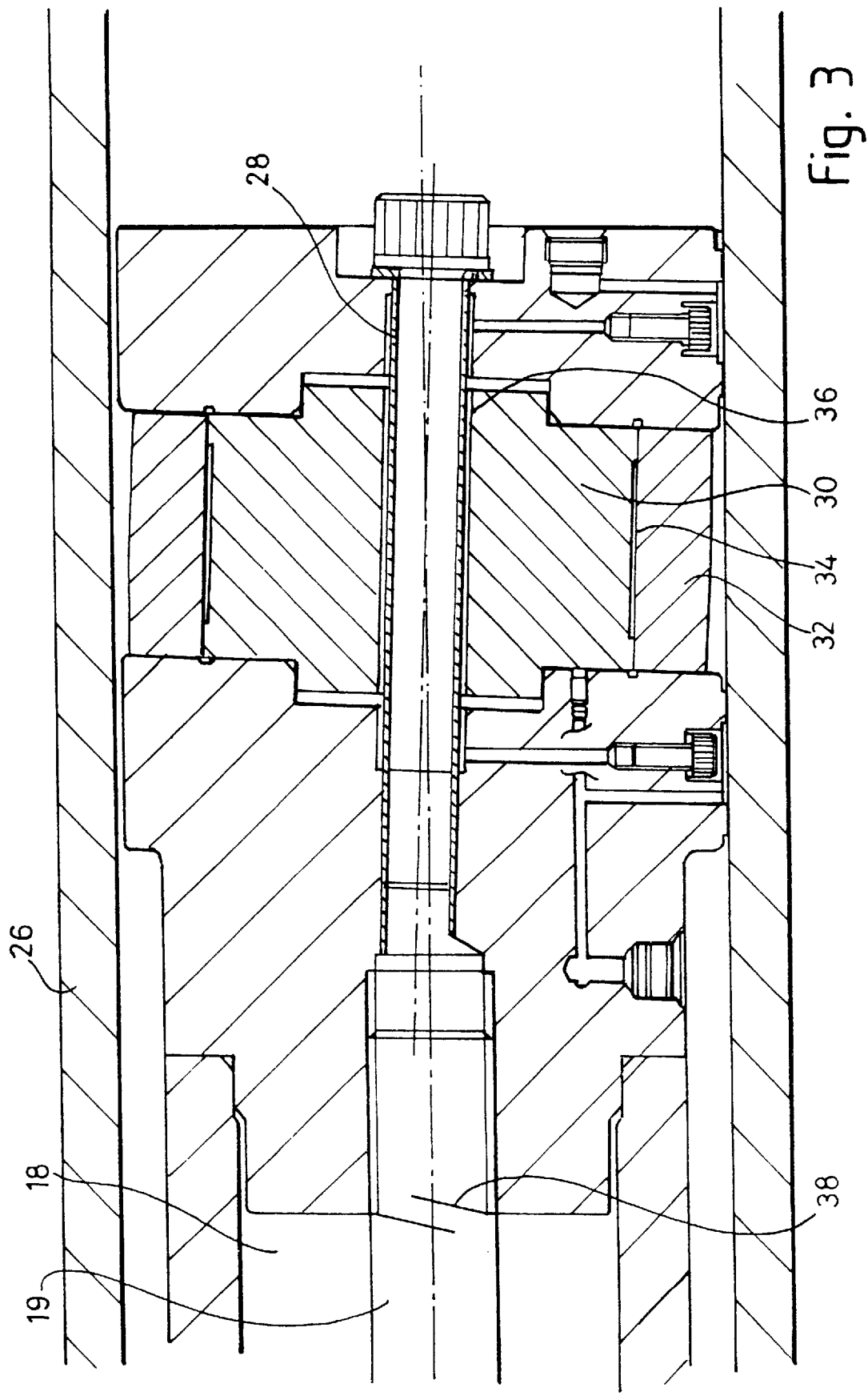
Figure 4:
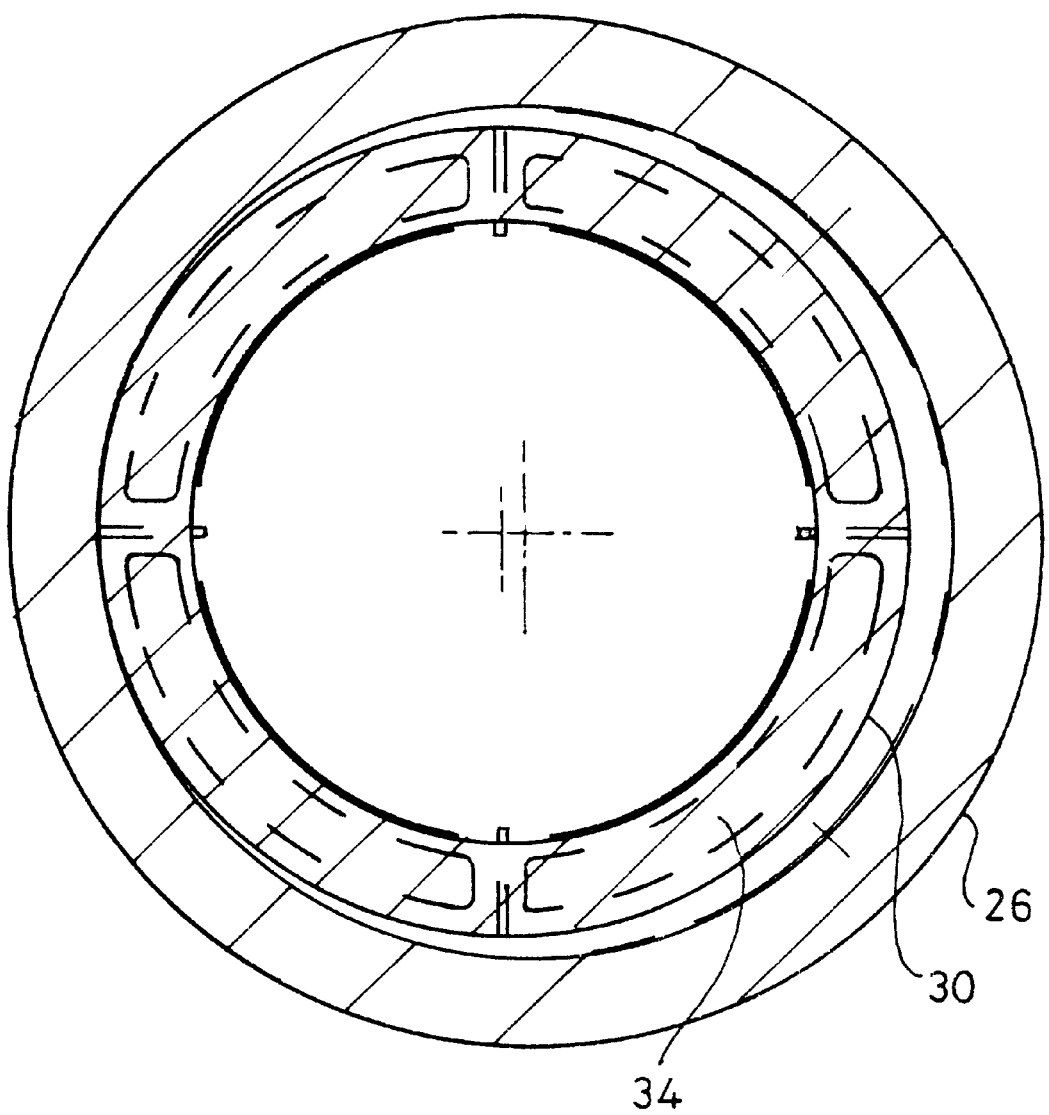
FIG. 4 is a transverse cross section through the skewed roller assembly.

The invention is essentially concerned with the skewed roller assembly 24 shown on the right-hand side of FIG. 1, and also in FIGS. 2 to 4. The purpose of this skewed roller assembly is to drive an outer tube 26, which in practice is fixed to the carriage of a machine tool, with a precisely controlled linear, axial movement.

The skewed roller assembly is carried by a central shaft 28 fixed to and extending from the trailing end of the drive bar 18 with its axis at a small angle of inclination to that of the drive bar. Fixed to the shaft 28 to rotate concentrically therewith about the skewed axis is the annular roller assembly, formed as inner and outer parts 30, 32. The skewed outer part 32 is urged by four hydrostatic pads 34 (see FIGS. 2 and 4) to bear against the interior of the outer tube 26 at points around a helical path, whereby the outer tube is frictionally driven with a linear axial movement as the roller assembly rotates.

FIG. 3 shows, in particular, that oil is also supplied, as indicated at 36, to the axial face and the and faces of the roller assembly 30, 32, so that the assembly is fully floating, hydrostatically. Oil pressure at the roller assembly, including that of the hydrostatic pads 34, is controlled by restrictors 38 in the central axial passage in the drive bar 18.

Oil seeping to the outside of the roller assembly 30, 32 and tending to fill the driven tube ahead of and to the rear of the roller assembly, is conveniently returned to the driving head 10, where the oil return passage 22 is located via the inside of a corrugated and axially extensible tube 40 fixed between the forward end of the driven tube 26 and the housing of the driving head.

I claim:

1. A twist action roller friction drive comprising a rotatable drive bar, a driven member which is rotationally fixed relative to the drive bar, and which is mounted for translational movement along a first axis, inclined roller means driven, in use, in rotation by the drive bar about a second axis which is inclined relative to the first axis, the driven member being engaged by the roller means, wherein the inclined roller means comprises a single annular roller and urging means for urging the annular roller into driving contact with the driven member, the urging means comprising at least one hydrostatic pad means situated inside the annular roller.

2. A friction drive as claimed in claim 1 wherein the driven member is a tube and the annular roller frictionally engages the internal bore of the tube.

3. A friction drive as claimed in claim 2 wherein the tube is of steel.

4. A friction drive as claimed in claim 3 wherein the inner surface of the tube is hardened and ground.

5. A friction drive as claimed in claim 1 wherein the drive includes a high speed drive motor for rotating the drive bar, the motor having velocity feedback control.

6. A friction drive as claimed in claim 1 wherein the drive bar is rotatable about an axis, and oil for the hydrostatic pad means acting on the roller is supplied, in use, through the drive bar along the axis.

7. A friction drive as claimed in claim 6 wherein the drive bar comprises a cylindrical tube.

8. A friction drive as claimed in claim 7 wherein the roller means further comprises a skewed roller assembly in which the annular roller is incorporated, the skewed roller assembly is situated at a first, trailing end of the drive bar and the drive bar has a remote forward end which, in use, is driven in rotation by drive means and the forward end being mounted on hydrostatic bearings.

9. A friction drive as claimed in claim 8 wherein the drive includes a common oil supply for supplying oil to the hydrostatic pads means and to the hydrostatic bearing, the oil being supplied along the central axis of the drive bar to the skewed roller assembly.

10. A friction drive as claimed in claim 9 wherein the oil is supplied to the skewed roller assembly via a restrictor.

11. A friction drive as claimed in claim 10 wherein, at the skewed roller assembly, drillings are provided to supply oil to the bore and end faces of the roller, so that the roller assembly is fully floating hydrostatically on a spindle projecting from the first bend of the drive bar.

12. A friction drive as claimed in claim 11 wherein further drillings for supplying oil to the hydrostatic pad means comprises four equi-angularly spaced hydrostatic pads, the roller assembly having the pads which urge the skewed roller assembly radially so that the roller is in frictional driving engagement with the driven tube.

13. A friction drive as claimed in claim 12 wherein oil seeping from the roller assembly is returned to a sump at the driven end of the drive bar, via the interior of an extensible tube, which is secured between the forward end of the driven tube and a housing at the forward end of the drive bar, wherein drillings are provided to supply oil to the hydrostatic bearings which locate a rotating assembly carrying the forward end of the drive bar.

14. A friction drive as claimed in claim 13 wherein the extensible tube is corrugated or telescopic.

15. A friction drive as claimed in claim 1 wherein the extent of axial movement of the driven member, for a single revolution of the roller, is determined by the angle of skew of the roller.

16. A friction drive as claimed in claim 15 wherein small precise axial movements of the driven member of the order of 1 nm (nanometre) are achieved per revolution of the drive bar.

17. A machine tool having a carriage, a machine axis and a twist action roller friction drive as claimed in claim 1 wherein said driven member is fixed to or comprises an integral part of the carriage and is aligned with the machine axis.

* * * * *